US008754179B2

(12) United States Patent
Tong et al.

(10) Patent No.: US 8,754,179 B2
(45) Date of Patent: Jun. 17, 2014

(54) LIGHT ACTIVATED SHAPE MEMORY CO-POLYMERS

(75) Inventors: Tat Hung Tong, Bellbrook, OH (US); Emily Snyder, Kettering, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 971 days.

(21) Appl. No.: 11/576,749

(22) PCT Filed: Oct. 6, 2005

(86) PCT No.: PCT/US2005/035956
§ 371 (c)(1),
(2), (4) Date: Sep. 14, 2007

(87) PCT Pub. No.: WO2007/001407
PCT Pub. Date: Jan. 4, 2007

(65) Prior Publication Data
US 2008/0021166 A1    Jan. 24, 2008

Related U.S. Application Data

(60) Provisional application No. 60/616,447, filed on Oct. 6, 2004.

(51) Int. Cl.
*C08F 24/00* (2006.01)
(52) U.S. Cl.
USPC ........... 526/266; 526/258; 526/262; 526/265; 526/310; 526/280; 526/284; 568/679
(58) Field of Classification Search
USPC ......... 526/258, 262, 265, 266, 310, 332, 280, 526/284; 568/679
See application file for complete search history.

(56) References Cited

U.S. PATENT DOCUMENTS

| | | | | | |
|---|---|---|---|---|---|
| 3,023,100 | A | * | 2/1962 | Wilhelm et al. | 430/283.1 |
| 3,357,831 | A | * | 12/1967 | Wu | 430/287.1 |
| 3,453,110 | A | * | 7/1969 | Delzenne et al. | 430/287.1 |
| 4,079,183 | A | * | 3/1978 | Green | 560/52 |
| 4,634,644 | A | * | 1/1987 | Irving et al. | 430/18 |
| 4,769,308 | A | * | 9/1988 | Hiruma et al. | 430/272.1 |
| 4,948,695 | A | * | 8/1990 | Matsushita et al. | 430/138 |
| 5,240,808 | A | * | 8/1993 | Aoshima et al. | 430/175 |
| 5,286,803 | A | * | 2/1994 | Lindsay et al. | 525/329.7 |
| 5,462,976 | A | * | 10/1995 | Matsuda et al. | 522/74 |
| 6,159,389 | A | * | 12/2000 | Miura et al. | 252/62.2 |
| 6,201,087 | B1 | * | 3/2001 | Herr et al. | 526/268 |
| 6,388,043 | B1 | * | 5/2002 | Langer et al. | 528/80 |
| 6,720,402 | B2 | | 4/2004 | Langer et al. | |
| 2002/0064731 | A1 | * | 5/2002 | Kim | 430/325 |
| 2002/0137864 | A1 | * | 9/2002 | Tong | 526/227 |
| 2006/0257629 | A1 | * | 11/2006 | Lendlein et al. | 428/195.1 |
| 2007/0123690 | A1 | * | 5/2007 | Parham et al. | 528/373 |
| 2007/0244326 | A1 | * | 10/2007 | Shea et al. | 546/14 |
| 2008/0269420 | A1 | * | 10/2008 | Tong et al. | 525/208 |

FOREIGN PATENT DOCUMENTS

| | | | | | |
|---|---|---|---|---|---|
| JP | | 06332170 A | * | 12/1994 | G03F 7/027 |
| JP | | 2001108829 A | * | 4/2001 | G02B 5/30 |
| WO | PCT/US1999/03923 | | | 8/1999 | |
| WO | | WO 9942147 A1 | * | 8/1999 | A61L 27/00 |
| WO | | WO 2004062706 A1 | * | 7/2004 | A61L 27/14 |

OTHER PUBLICATIONS

Kuckling et al., "Photochemical switching of hydrogel film properties", Polymer 2002, 43, 1813-1820.*
Fang et al., "Photocrosslinkable polymers bearing pendant conjugated heterocyclic chromophores", Polymer 2002, 43(12), 3505-3510.*
Lee et al., "Photochromic behavior of spiropyran in the photoreactive polymer containing chalcone moieties", Dyes and Pigments 2004, 61, 235-242.*
Definition of "curing" in the IUPAC Compendium of Chemical Terminology, 2nd ed. (the "Gold Book"). Compiled by A. D. McNaught and A. Wilkinson. Blackwell Scientific Publications, Oxford (1997).*

* cited by examiner

*Primary Examiner* — Robert C Boyle
(74) *Attorney, Agent, or Firm* — Dinsmore & Shohl LLP

(57) ABSTRACT

The present discovery uses monomers which contain reversible photo-crosslinkable groups in addition to primary polymerizable groups. The mechanical properties of these materials and the reversibility of the photo-activated shape memory effect demonstrate the effectiveness of using photo-irradiation to effect change in modulus and shape memory effect. In the preferred embodiment the reaction mixture includes a photo-reactive monomer comprising a photo reactive group and a polymerizable group; a second monomer, which is more preferably a mixture of monomers, which are acrylate based; a multi-functional crosslinking agent, preferably 1,6 hexanediol diacrylate (HDODA); an initiator, preferably a free radical initiator; and a fifth, optional, component which is a modifying polymer. The mixture of the second monomer, crosslinking agent, and initiator comprise the base polymer matrix into which the photo-reactive monomer is incorporated. The polymeriziable group of the photo reactive monomer allows the photo reactive monomer to polymerize with the base polymer matrix.

12 Claims, 1 Drawing Sheet

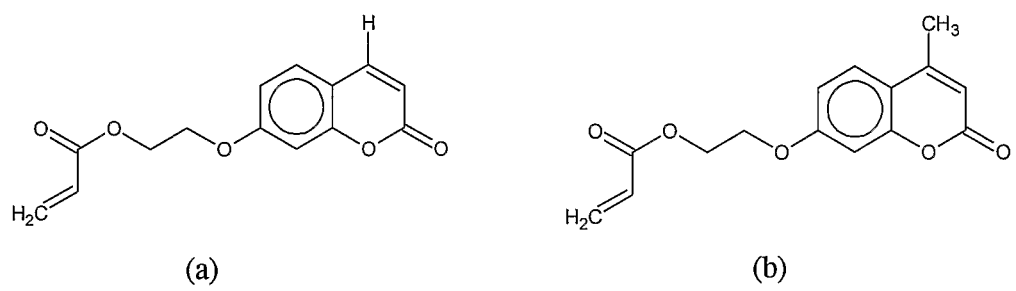

US 8,754,179 B2

LIGHT ACTIVATED SHAPE MEMORY CO-POLYMERS

CROSS-REFERENCE TO RELATED APPLICATION

Priority benefit of U.S. provisional application Serial No. 60/616,447 filed Oct. 6, 2004 is claimed.

FEDERALLY SPONSORED RESEARCH

The United States Government has rights in this invention pursuant to Contract No. FA8650-04-C-7102 between Defense Advanced Research Project Agency (DARPA), DSO Defense Sciences and Technology BAA03-02 and Cornerstone Research Group, Inc.

BACKGROUND OF THE INVENTION

1. Field of the Invention

The present invention is directed to light activated shape memory polymers (LASMPs), their production and use. More particularly, the current invention comprises a reaction product of a photo-reactive monomer and at least one monomer in the form of a cross-linked thermoset network in the presence of an initiator and a catalyst, structural modifier, curing agent, all, some, or none. The photo-reactive agents in these shape memory polymers allow for the shape memory effect to occur in response to different wavelengths at or near those of ultraviolet (UV), infrared (IR), or visible light, although electromagnetic waves of different wavelengths, such as radar, microwave, and X-rays, could also be used.

Shape memory is the ability of a material to remember its original shape after deformation, and return to its original shape upon activation of the shape memory effect. This phenomenon is based on a structural phase transformation. Presently the majority of shape memory polymers require activation of the shape memory effect through heat. The need for a SMP that can be activated by means other than heat is obvious to those that work in areas where heating material above ambient temperatures can be dangerous such as biomedical applications or where raising the temperature of the SMP above its transition temperatures ("$T_g$") requires large amounts of energy, such as with space vehicles and aircraft. A material that can be deformed into a desired shape, and then safely returned to its original shape by exposure to light, instead of heat, would be invaluable to these applications. The present invention is also drawn to a shape memory polymer thermosetting resin having compatibility with polymers employed in high temperature, high strength and high tolerance processes in manufacturing.

Shape memory polymers (SMPs) are a unique class of polymers, which soften and harden quickly and repetitively on demand. This feature provides the ability to temporarily soften, change shape, and harden back to a solid structural state in various new highly detailed shapes and forms. Typical SMPs have a very narrow temperature span in which they transition between hard and soft states. This narrow glass transition temperature span is a key physical property that allows a SMP to maintain full structural rigidity up to a specifically designed activation temperature. Yet with as little as 5° C. to 10° C. increase above that temperature it quickly softens and allows shape change and subsequent re-hardening into new shapes.

The light activated properties of the presented polymers alters the $T_g$ of these materials such that the $T_g$ is below ambient temperature rather than heating the polymers to affect a shape change. Thus, instead of using heat, the application of light lowers or raises the $T_g$ of the polymer so that the $T_g$ of the material varies based on if the desired state of the material is hard, a higher $T_g$ than ambient, or soft, a lower $T_g$ than ambient.

2. Background of Prior Art

Shape memory materials are materials capable of distortion above their glass transition temperatures ($T_g$s), which store such distortion at temperatures below their $T_g$ as potential mechanical energy in the material, and release this energy when heated again to above the $T_g$, returning to their original "memory" shape. In essence, these materials can be "fixed" to a temporary shape under specific conditions of temperature and stress and later, under thermal, electrical, or other environmental command, the associated elastic deformation can be completely or substantially relaxed to the original, stress-free, condition.

SMAs

The first materials known to have these properties were shape memory metal alloys (SMAs), including TiNi (Nitinol), CuZnAl, and FeNiAl alloys. The shape-memory capabilities of the these metallic materials capable of exhibiting shape-memory characteristics occur as the result of the metallic alloy undergoing a reversible crystalline phase transformation from one crystalline state to another crystalline state with a change in temperature and/or external stress. With a temperature change of as little as about 10° C., these alloys can exert a stress as large as 415 MPa when applied against a resistance to changing its shape from its deformed state. Such alloys have been used for such applications as intelligent materials and biomedical devices. These materials have been proposed for various uses, including vascular stents, medical guide wires, orthodontic wires, vibration dampers, pipe couplings, electrical connectors, thermostats, actuators, eyeglass frames, and brassiere underwires. With a temperature change of as little as 10° C., these alloys can exert a stress as large as 415 MPa when applied against a resistance to changing its shape from its deformed shape. However, these materials have not yet been widely used, in large part because they are very expensive. Additionally, their applications have been limited due to limited ability to withstand strains greater than approximately 8%.

SMPs

Shape memory polymers (SMPs) are being developed to replace or augment the use of SMAs, in part because the polymers are lightweight, high in shape recovery ability, easy to manipulate, and economical as compared with SMAs. SMPs are materials capable of distortion above their glass transition temperature ($T_g$), storing such distortion at temperatures below their $T_g$ as potential mechanical energy, via elastic deformation, in the polymer, and release this energy when heated to temperatures above their $T_g$, returning to their original memory shape. When the polymer is heated to near its transition state it becomes soft and malleable and can be more easily deformed. When the temperature is decreased below its $T_g$, the deformed shape is fixed by the higher rigidity of the material at a lower temperature while, at the same time, the mechanical energy expended on the material during deformation will be stored. Thus, favorable properties for SMPs will closely link to the network architecture and to the sharpness of the transition separating the rigid and rubbery states.

Polymers intrinsically show shape memory effects on the basis of rubber elasticity, but with varied characteristics of temporary shape fixing, strain recovery rate, work capability during recovery, and retracted state stability. The first shape memory polymer (SMP) reported as such was cross-linked polyethylene; however, the mechanism of strain recovery for this material was immediately found to be far different from that of the shape memory alloys. Indeed, shape memory polymer is actually a super-elastic rubber. When the polymer is heated to a rubbery state, it can be deformed under resistance of ~1 MPa modulus. When the temperature is decreased below the glass transition temperature ($T_g$), the deformed shape is fixed by the higher rigidity of the material at lower temperature while, at the same time, the mechanical energy expended on the material during deformation will be stored. When the temperature is raised above the $T_g$, the polymer will recover to its original form as driven by the restoration of network chain conformation entropy. Thus favorable properties for SMPs will be closely linked to the network architecture and to the sharpness of the transition separating the rigid and rubber states. Compared with SMAs, SMPs can withstand high strains, typically at least 200% to 400%, while the maximum strain of the SMA is typically less than 8%. As an additional advantage, due to the versatility of polymers, the properties of SMP can be tailored according to the application requirements, a factor that is very important in industry.

Several physical properties of SMPs other than the ability to memorize shape are significantly altered in response to external changes in temperature and stress. These properties include the elastic modulus, hardness, flexibility, vapor permeability, damping, index of refraction, and dielectric constant. The elastic modulus (the ratio of the stress in a body to the corresponding strain) of an SMP can change by a factor of up to 200 when heated above its melting point or glass transition temperature. Also, the hardness of the material changes dramatically when it is at or above its melting point or glass transition temperature. When the material is heated to a temperature above the melting point or glass transition temperature, the damping ability can be up to five times higher than a conventional rubber product. The material can readily recover to its original molded shape following numerous thermal cycles.

Heretofore, numerous polymers have been found to have particularly attractive shape memory effects, most notably the polyurethanes, polynorbornene, styrene-butadiene copolymers, and cross-linked polyethylene.

In the literature, polyurethane-type SMPs have generally been characterized as phase segregated linear block co-polymers having a hard segment and a soft segment. The hard segment is typically crystalline, with a defined melting point, and the soft segment is typically amorphous, with a defined glass transition temperature. In some embodiments, however, the hard segment is amorphous and has a glass transition temperature rather than a melting point. In other embodiments, the soft segment is crystalline and has a melting point rather than a glass transition temperature. The melting point or glass transition temperature of the soft segment is substantially less than the melting point or glass transition of the hard segment.

Examples of polymers used to prepare hard and soft segments of known SMPs include various polyethers, polyacrylates, polyamides, polysiloxanes, polyurethanes, polyether amides, polyurethane/ureas, polyether esters, and urethane/butadiene copolymers. See, for example, U.S. Pat. No. 5,506,300 to Ward et al.; U.S. Pat. No. 5,145,935 to Hayashi; U.S. Pat. No. 5,665,822 to Bitler et al.; and U.S. Pat. No. 6,720,420 to Langer et al.

Conventional SMPs generally are segmented polyurethanes and have hard segments that include aromatic moieties. U.S. Pat. No. 5,145,935 to Hayashi, for example, discloses a shape memory polyurethane elastomer molded article formed from a polyurethane elastomer polymerized from of a difunctional diiiosicyanate, a difunctional polyol, and a difunctional chain extender.

Recently, however, SMPs have been created using reactions of different polymers to eliminate the need for a hard and soft segment, creating instead, a single continuous piece of SMP. U.S. Pat. No. 6,759,481 to Tong, discloses such a SMP using a reaction of styrene, a vinyl compound, a multifunctional crosslinking agent and an initiator to create a styrene based SMP.

The limitations with all of these existing shape memory polymers lie in the thermal characteristics and tolerances of the material. Heat is the primary source for activating the shape memory effect in these materials. However, the $T_g$ of the material may be too low for conditions in which the system will reside, leading to the material being incapable of activation. An example of such a situation is a hot region with an ambient temperature exceeding the transition temperature of the SMP; such a climate would not allow the polymer to efficiently make use of its rigid phase. A SMP capable of achieving a shape memory effect in such a climate would be useful. Thus there is a need for a SMP that can be activated using light or other form of electromagnetic energy.

It is an object of the present invention to provide a light activated shape memory polymer that is able to form object which can hold shape in memory in which the $T_g$ can be tailored according to the intended application.

Another object of the invention is to provide light activated shape memory polymers that are able to form objects which can hold shape in memory in which the transition temperature and the rubbery modulus can be tailored according to the intended application and the recoverable strain can exceed several hundred percent.

It is a further object of the present invention to provide light activated shape memory polymers with physical and chemical structures that are different from those in the known shape memory polymers.

It is still a further object of the invention to provide light activated shape memory polymers that can be processed as castable formulations in the form of coatings, films and adhesives.

SUMMARY OF THE INVENTION

The present discovery uses monomers which contain reversible photo-crosslinkable groups in addition to primary polymerizable groups. These monomers were formulated and cured with other monomers to form photo-responsive polymers. The mechanical properties of these materials, the kinetics, and the reversibility of the photo-activated shape memory effect demonstrate the effectiveness of using photo-irradiation to effect change in modulus (and thus shape memory effect).

It is well known that the $T_g$ of a thermosetting polymer is proportional to its crosslinking density. It is possible for the crosslinking density of a room temperature elastomer to be modified through photo-crosslinking special photo-reactive monomer groups incorporated into the material system in order to increase its $T_g$. Correspondingly, the modulus will change from a hard state to a soft stated upon exposure to certain wavelengths of electromagnetic (EM) radiation. As a result, the material is transformed from an elastomer to a rigid glassy photoset, depending on the crosslinking density achieved during exposure to the proper wavelength of light.

The use of photo-reactive monomers allows the light activated shape memory polymer (LASMP) to undergo photo reversible reactions which are used to crosslink and hold the polymer together in a temporary shape after exposure to one wavelength of EM radiation. The original shape of the material is typically determined during its curing phase by the mold in which in it is cured. This crosslinking between the photo-reactive groups is reversible by irradiation with a different wavelength, thus making it possible to produce LASMP materials that could be deformed at room temperature, held in deformed shape by photo-irradiation using one wavelength, and recovered to the original shape by irradiation with a different wavelength. As these reactions are photo reversible, the bonds can be made and broken through any number of cycles. In order to be deformed again, the cleaved bonds will need to be remade after cleavage by exposure to the second wavelength of EM radiation in order to memorize the new shape. Linking and cleavage are induced by different wavelengths of IR, visible, or UV light.

In the preferred embodiment the shape change occurs in response to exposure to different wavelengths of light. Therefore, LASMP differs from conventional shape memory polymer (SMP) basically in its method of activation of the shape memory effect. In all SMPs a permanent, or memorized shape, is given to the material while the material is curing. This memorized shape is typically the shape of the container or mold in which the SMP is cured. Typically SMP is cured in a flat sheet in the shape of a circle, square, or rectangle or cured in a mold in the shape of a cylinder, sphere, or cube, but other geometric shapes are possible. In addition to the normal makeup of SMP, LASMP includes a photo reactive monomer that is capable of undergoing additional reversible photo-crosslinking. This additional reversible photo-crosslinking gives LASMP the ability to undergo shape change upon exposure to certain wavelengths of ultraviolet (UV), infrared (IR), or visible light. After curing, the LASMP is deformed to a desired shape and exposed to one wavelength which is used to initiate additional crosslinking between the photo-reactive bonding sites. This exposure allows the LASMP to be temporarily fixed in the deformed shape by the additional crosslinking between the linear polymers. If desired, exposure to a second wavelength will cleave the bonds created during the additional photo-crosslinking, allowing the LASMP to return to its permanent, memorized shape. Since the additional photo-crosslinking is reversible, it is possible to alternate the LASMP many times between a hard and soft state "fixing" different shape after each exposure to the first wavelength. LASMP can undergo this bonding and cleaving cycle any number of times.

In general, the monomeric mixtures that are used to make shape memory polymers (SMP) consist of three major components: at least one monomer, and preferably at least two different monomers and a crosslinking agent, curing agent, both, or neither depending on the base polymer matrix. During homopolymerization, the monomers will produce polymers of different glass transition temperatures ($T_g$). Conventional SMPs may contain one or two conventional monomers and a conventional crosslinking agent. LASMPs, however, have a special photo-reactive monomer capable of a reversible photo-crosslinking and cleaving process incorporated into the system as a monomer during homopolymerization. This photo-reactive monomer also acts as an additional crosslinking agent upon irradiation with specific wavelengths of ultraviolet (UV), infrared (IR), or visible light. LASMP mixtures can be formulated in such a way that the initial glass transition temperatures can be tuned to match the operational temperatures of specific applications. This tuning is accomplished by varying the ratio of individual components within the mixture. In the most preferred embodiment, these mixtures are formulated by using one or two commercially available acrylate monomers, such as methyl methacrylate and butyl acrylate, to fine tune the material's $T_g$ as needed, synthesized coumarin-based photo-sensitive monomers and multi-functional crosslinking monomers such as 1,6 hexanediol diacrylate (HDODA).

LASMP's can be thermoplastic or thermoset, interpenetrating networks, semi-interpenetrating networks, or mixed networks. The polymers used can be a single polymer or a blend of polymer, they can be linear or branched thermoplastic elastomers with or without side chains or any kind of dendritic structural elements. The preferred stimuli for causing shape change or shape memory effect is electromagnetic (EM) radiation at or near the visible light, UV, or IR spectrum. Other types of EM radiation, such as different wavelengths or energy, could also be used to effect shape change.

It is well known that polymers will absorb light at different wavelengths, depending on their chemical structure. Polymers typically show strong absorption of EM radiation in the infrared (IR), visible, and ultraviolet (UV) spectrums. LASMP can be cured with light including frequencies in the previously mention spectra. The absorption characteristics of the LASMP can be modified by using different photo-reactive monomers, base polymer monomers, crosslinking agents, or modifying polymer allowing for different wavelengths to activate the shape memory effect. Additionally it is possible to add a "photon up conversion dye" dye to the monomeric mixture. The addition of this dye allows the material to covert photon from a different wavelength to the activation wavelength, allowing for a wider range of applications.

BRIEF DESCRIPTION OF THE DRAWINGS

FIG. 1 illustrates structures of coumarin-based photo-responsive monomers.

DETAILED DESCRIPTION OF THE INVENTION

Light activated Shape memory polymer (LASMP) compositions, articles of manufacture thereof, and methods of preparation and use thereof are provided. The light activated shape memory polymers are typically composed of one continuous piece of light activated shape memory polymer whose glass transition temperature ($T_g$) is determined by the ratio and types of monomers added.

The present discovery is a reaction mixture which, after curing, polymerizes into LASMP. In the preferred embodiment the reaction mixture includes a photo-reactive monomer comprising a photo reactive group and a polymerizable group; a second monomer, which is more preferably a mixture of monomers, which are acrylate based, and most preferably a mixture of methyl methacrylate and butyl acrylate, added in proportion to fine tune the material's $T_g$ as needed; a multi-functional crosslinking agent, preferably 1,6 hexanediol diacrylate (HDODA); an initiator, preferably a free radical initiator; and a fifth, optional, component which is a modifying polymer. The mixture of the second monomer, crosslinking agent, and initiator comprise the base polymer matrix into which the photo-reactive monomer is incorporated of which the second monomer is the primary component. The polymeriziable group of the photo reactive monomer allows the photo reactive monomer to be polymerized with the base polymer matrix.

As stated above, the photo-reactive monomer consists of two principle groups, a photo reactive group and a polymerizable group that allows the photo reactive monomer to be incorporated into the base polymer matrix. The photo reactive group must be able to undergo reversible photo-crosslinking. The photo reactive monomer, with a polymerizable group, is preferably 3-(2-Benzothiazolyl)-7-(diethylamino)coumarin, 3-(2-Benzothiazolyl)-7-(diethylamino)coumarin-4-carboxylic acid, 3-(2-Benzothiazolyl)-7-(diethylamino)coumarin-4-carboxylic acid N-succinimidyl ester, 3-(2-bromoethyl)coumarin, 3-[4-(Bromomethyl)phenyl]-7-(diethylamino) coumarin, 3-(Bromoacetyl)coumarin, 4-cyano-7-diethylamino-3-(methoxycarbonylacetyl)coumarin, 4-methyl-7-(phenylacetamido)coumarin, 6,7-Diethoxy-4-(trifluoromethyl)coumarin, 6,7-Dihydroxy-4-(trifluoromethyl)coumarin, 6-bromo-3-(2,3-dichlorophenylcarbamoyl)-coumarin, 6-bromo-3-(2,5-dichlorophenylcarbamoyl)-coumarin, 7-[4-(Trifluoromethyl)coumarin]acrylamide, 7-[4-(Trifluoromethyl)coumarin]methacrylamide, 7-Amino-4-(2,5,8-trioxanonyl)coumarin, 7-Amino-4-(trifluoromethyl)coumarin, 7-Diethylamino-3-[N-(2-maleimidoethyl) carbamoyl]coumarin, 7-Diethylamino-3-[N-(3-maleimidopropyl)carbamoyl]coumarin, 7-(Diethylamino) coumarin-3,4-dicarboxylic acid, 7-(Diethylamino) coumarin-3-carbohydrazide, 7-(Diethylamino)coumarin-3-carbonyl azide, 7-(Diethylamino)coumarin-3-carboxylic acid, 7-(Diethylamino)coumarin-3-carboxylic acid N-succinimidyl ester, 7-(Diethylamino)coumarin-3-carboxylic imidazolide, 7-Ethoxy-4-(trifluoromethyl)coumarin, 7-Hydroxy-4-(trifluoromethyl)coumarin, 7-Methoxy-4-(trifluoromethyl)coumarin, 7-Octadecyloxy-3-[3-(3-sulfopropyl)-2-benzothiazolylio]coumarin, 7-(Phenylacetaniido)-4-(trifluoromethyl)coumarin, Cholesteryl coumarin-3-carboxylate, Coumarin-3-carboxylic acid, Coumarin-3-carboxylic acid acetoxymethyl ester, Coumarin-6-sulfonyl chloride, L-Leucine 7-amido-4-methyl coumarin Hydrochloride, Poly[methylmethacrylate-co-(7-(4-trifluoromethyl) coumarin acrylamide)], Poly[methylmethacrylate-co-(7-(4-trifluoromethyl)coumarin methacrylamide)], 3-(α-Acetonylbenzyl)-4-hydroxycoumarin Sodium salt, 7-Acetoxy-3-(2-benzoxazolyl)coumarin, 3-Acetyl-7-(β-D-glucopyranosyloxy)coumarin, 7-Acetoxy-4-(bromomethyl) coumarin, 3-(2-Benzimidazolyl)-7-(diethylamino)coumarin, 2,3,5,6-1H,4H-Tetrahydroquinolizino[9,9a,1-γη]coumarin, 7-Amino-4-methylcoumarin, 7-Amino-4-trifluoromethyl-coumarin, 7-Diethylamino-4-methylcoumarin, 6-methoxy-benzo[f]coumarin-3-carboxylate, 3-(α-Acetonyl-2-furylmethyl)-4-hydroxycoumarin, Furo[3,2-γ]coumarin, 4-Hydroxy-3-(3-oxo-1-phenylbutyl)coumarin, 3-(2-N-Methylbenzimidazolyl)-7-N,N-diethylaminocoumarin, 2,3,5,6-1H,4H-Tetrahydro-9-carbethoxyquinolizino-[9,9am,1-γη] coumarin, 2,3,5,6-1H,4H-Tetrahydro-8-isopropylquinolizino-[9,9am-1-γη]coumarin, 3-(2-Benzothiazolyl)-7-(diethylamino)coumarin, 7-(Dimethylamino)-4-(trifluoromethyl)coumarin, 2,3,6,7-Tetrahydro-9-trifluoromethyl-1H,5H-quinolizino(9,1-γη) coumarin, 2,3,6,7-Tetrahydro-9-methyl-1H,5H-quinolizino (9,1-γη)coumarin, 2,4-dinitro-3',4'-(methylenedioxy)-stilbene, 4,4'-Bis(2-benzoxazolyl)stilbene, 4,4'-bis (methoxymethoxy)stilbene, 4-Nitro-4'-(octadecylamino) stilbene, α,β-Bis(phenylazo)stilbene, cis-1,2-Bis(4,4,5,5-tetramethyl-1,3,2-dioxaborolan-2-yl) stilbene, 4-Dibutylamino-4'-(trifluoroacetyl)stilbene, 4-Dioctylamino-4'-(trifluoroacetyl)stilbene, 3,3',4,5'-Tetrahydroxy-trans-stilbene, 3,4',5-Trihydroxy-trans-stilbene, 4-allyl-2-methoxyphenyl cinnamate, 4-methoxyphenyl cinnamate, allyl cinnamate, Benzyl cinnamate, cholesteryl cinnamate, Cinnamyl cinnamate, ethyl 2-chloro-α-cyano-4-(dimethylamino)-cinnamate, ethyl 6-bromo-α-cyano-(3,4-methylenedioxy)cinnamate, ethyl β-cyano-4-(diethylamino)cinnamate, ethyl α-cyano-4-(dimethylamino)cinnamate, ethyl β-cyano-α-hydroxy-2-(1-naphthyl)cinnamate, Ethyl cinnamate, Isoamyl cinnamate, isobutyl α-cyano-3,4-(methylenedioxy) cinnamate, Isobutyl cinnamate, isopentyl cinnamate, isopropyl cinnamate, Methyl cinnamate, Methyl trans-cinnamate, phenethyl cinnamate, phenyl cinnamate, Poly(vinyl cinnamate), (S)-(+)-2-Methylbutyl 4-(4-decyloxybenzylidene-amino)cinnamate, tert-Butyl cinnamate, Vinyl cinnamate, O,O'-BIS-(TRIMETHYLSILYL)-THYMINE, Thymine-1-acetic acid, Thymine 1-β-D-arabinofuranoside, 2',3'-Didehydro-3'-deoxythymidine, 6-(2-thiazolylazo)thymine, 1-(2-carboxyethyl)thymine, Thymine-modified poly(2-methyl-2-oxazoline)s, octadecanyl ester of 1-(2-carboxyethyl) thymine, 1-(2,4,6-Tri-O-acetyl-3-O-tosyl-β-d-glucopyranosyl)thymine, 2,2-O-anhydro-(4,6-O-phenylmethylene-β-d-altropyranosyl)thymine, 1-(2,3-O-anhydro-4,6-O-phenylmethylene-β-d-mannopyranosyl) thymine, 1-(2,3-dideoxy-3-C-hydroxy methyl-5-O-trityl-β-d-threo-pentofuranosyl)thymine, 1-(3-C-chloromethyl-2,3-dideoxy-β-d-threo-pentofuranosyl)thymine, 1-(3-C-chloromethyl-2,3-dideoxy-β-d-threo-pentofuranosyl) thymine, 1-(2,3-dideoxy-3-C-iodomethyl-β-d-threo-pentofuranosyl)thymine, 1-(2,3-dideoxy-3-C-(O,O'-diethylphosphono)methyl-β-d-threo-pentofuranosyl) thymine, 2,5-furylene vinylene derivatives, 2,5-thienylene vinylene derivatives, 1-alkyl-2,5-pyrrylene vinylene derivatives, 2,4'-dichloro-4-(dimethylamino)-chalcone, 2',4'-dimethyl-4-(dimethylamino)-chalcone, 3',4'-dichloro-3,4-(methylenedioxy)-chalcone, 3'-(trifluoromethyl)chalcone, 4-(2-diethylaminoethoxy)chalcone, 4'-bromo-3,4-(methylenedioxy)-chalcone, 4'-bromo-4-(dimethylamino)-chalcone, 4'-(carboxymethyl)chalcone, 4'-chloro-4-(dimethylamino)-chalcone, 4-(dimethylamino)chalcone, 4'-fluoro-3,4-(methylenedioxy)chalcone, 4'-methyl-3,4-(methylenedioxy)chalcone, 4'-(N,N-dimethylcarbamoylmethoxy)chalcone, Hesperidin methyl chalcone, trans-4-Iodo-4'-boranyl-chalcone.

More preferably the photo reactive group is coumarin based. FIG. 1 shows the structures of the two most preferred coumarin-based photo-responsive monomers.

The second group of the photo-reactive monomer is a polymerizable group that allows the photo reactive monomer to polymerize with the base polymer matrix. In the preferred embodiment each photo-reactive monomer contains only one polymerizable group, however, multiple polymerizable groups are possible. With out the presence of this polymerizable group the photo reactive monomer will not be able to be incorporated into the polymer backbones of the base polymer matrix. The selection of the polymerizable group will depend on the monomers selected for the base polymer matrix.

In the preferred embodiment the base polymer matrix is an acrylate based system. Polymerizable groups that will allow the photo-reactive monomer to incorporate into the base polymer matrix include, but are not limited to, acrylate, methacrylate, vinyl ether, vinyl, and allyl ether groups.

A second embodiment may use polyurethane as the base polymer matrix. Polymerizable groups that will allow the photo-reactive monomer to incorporate into the polyurethane base polymer matrix include, but are not limited to, hydroxyl, carboxylic acid, acyl chloride, isocyanate, amine and amide groups.

In a third embodiment the base polymer matrix is a siloxane based system. Polymerizable groups that will allow the photo-reactive monomer to incorporate into the siloxane base polymer matrix include, but are not limited to, silane, trialkoxy silyl in the form of —Si(OR)$_3$ where R can be a methyl or ethyl group.

In a fourth embodiment the base polymer matrix is an epoxy based system. Polymerizable groups that will allow the photo-reactive monomer to incorporate into the base polymer matrix include, but are not limited to, glycidyl ether, hydroxy, and amine groups.

In a fifth embodiment the base polymer matrix is an oxetane based system. Polymerizable groups that will allow the photo-reactive monomer to incorporate into the oxetane base polymer matrix include, but are not limited to, hydroxyl groups, thiol, amine, and oxetane.

As previously stated the base polymer matrix is primarily composed of a second monomer, and must contain at least one monomer. Preferably the second monomer is a mixture of at least two monomers which, when selected in conjunction with the polymerizable group of the photo-reactive monomer, will allow the photo-reactive monomer to be incorporated into the base polymer matrix. When there is a mixture of two or more monomers, one monomer typically has a high $T_g$ and the other a low $T_g$. This final glass transition temperature ($T_g$) of the LASMP to be adjusted or fine tuned based on the ratio of the two monomers added to the mixture to achieve a desired $T_g$. The polymer system can be based on an addition polymerization mixture or a condensation polymerization system. The second monomer for an addition polymerization type of base polymer system is at least one, but preferably a mixture of two or more of the following: methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate or undecyl methacrylate, vinyl neodecanoate, vinyl benzoate, vinyl propionate, vinyl stearate, a methylstyrene, which may be a mixture, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy)butyl stearate, 4-(vinyloxy)butyl benzoate, 4-(vinyloxymethyl)cyclohexylmethyl benzoate.

Of the previous compounds methyl acrylate, methyl methacrylate, butyl acrylate, hexyl acrylate, benzyl acrylate, cyclohexyl acrylate, decyl acrylate, phenyl acrylate are the more preferred compounds used to form the second monomer. The second monomer is most preferably a mixture of methyl methacrylate and butyl acrylate.

The second monomer for a condensation polymerization type of base polymer system is at least one, but preferably a mixture of two or more of the following:
1) Oxetane compounds created by the etherification by reacting an oxetane alcohol with a halogenated vinyl ether. Possible oxetane alcohols: one or a combination of two or more selected from 3-methyl-3-oxetane methanol, 3-methyl-3-oxetane ethanol, 3-methyl-3-oxetane propanol, 3-ethyl-3-oxetane methanol, 3-ethyl-3-oxetane ethanol, 3-ethyl-3-oxetane propanol, 3-propyl-3-oxetane methanol, 3-propyl-3-oxetane ethanol, 3-propyl-3-oxetane propanol. Possible halogenated vinyl ethers: one or a combination of two or more selected from 2-chloroethyl vinyl ether, 2-bromoethyl vinyl ether, 3-chloropropyl vinyl ether, 3-bromopropyl vinyl ether, 4-chlorobutyl vinyl ether, 4-bromobutyl vinyl ether.
2) Polyurethane compounds created by reaction of aliphatic or aromatic dicarboxylic acid, polyols and diisocyanate.
   a. Examples of aliphatic starting materials are: acyclic aliphatic dicarboxylic acids such as oxalic acid, malonic acid, succinic acid, glutaric acid, adipic acid, pimelic acid, suberic acid, azelaic acid, sebacic acid, undecanedicarboxylic acid, and dodecanedicarboxylic acid. Cycloaliphatic dicarboxylic acids such as 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid. The cycloaliphatic dicarboxylic acids may be used either in their cis or in their trans form or as a mixture of both forms. Polyols (diols and triols) such as ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl)benzene, trimethylolethane, trimethylolpropane, and glycerol.
   b. Examples of aromatic starting materials are: aromatic polycarboxylic acids such as phthalic acid, isophthalic acid, terephthalic acid, phthalic, isophthalic or terephthalic monosulfonate, or halophthalic acids, such as tetrachlorophthalic or tetrabromophthalic acid. Aromatic polyols are phenols, such as pyrocatechol, resorcinol, and hydroquinone, and also, in minor amounts, pyrogallol, phloroglucinol and hydroxyhydroquinone.
   c. Examples of diisocyanates used to make polyisocyanates are selected from the group consisting of isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3- isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, 2-heptyl-3,4-bis(9-isocyanatononyl)-1-pentylcyclohexane, 1,2-, 1,4-, and 1,3-bis(isocyanatomethyl)cyclohexane, 1,2-, 1,4-, and 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobuty-1-yl)cyclohexane, liquid bis(4-isocyanatocyclohexyl)-methane with a trans/trans content of up to 30% by weight, tolylene diisocyanate, xylylene diisocyanate, bisphenylene diisocyanate, naphthylene diisocyanate or diphenylmethane diisocyanate.

3) A siloxane copolymer having the general formula:

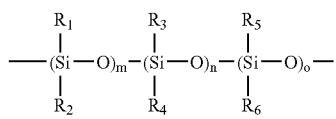

wherein $R_1$, $R_2$, $R_3$, $R_4$, $R_5$, and $R_6$ are independently $C_1$-$C_6$ alkyl, phenyl, or fluoroalkyl. At least one of these R groups will carry a reactive functionality, such as a hydroxyl, amine, carboxylic acid, acyl or epoxy group that allows the attachment of the photo-reactive group mentioned previously. "m" is in the molar fraction range of 0 to 1; "n" is in the molar fraction range of 0 to 1; and "o" is in the molar fraction range of 0 to 1, the copolymer having functional acryl groups at the terminal ends thereof.

4) Epoxy compounds can be formed from an epoxy resin and a curing agent. Epoxy resins include, but are not limited to, glycidyl ether type epoxy resins derived from bisphenol A, bisphenol F or tetrabromobisphenol A, novolak type epoxy resins, hydrogenated bisphenol A-based epoxy resins, glycidyl ether type epoxy resins derived from bisphenol A-propylene oxide adducts, p-hydroxybenzoic acid glycidyl ether ester type epoxy resins, m-aminophenol-based epoxy resins, diaminodiphenylmethane-based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyhydric alcohols such as glycerol, hydantoin type epoxy resins, epoxidization products from unsaturated polymers such as petroleum resins and the like. These epoxy resins may be used singly or two or more of them may be used in admixture.

a. Curing agents may be primary amines such as diethylenetriamine, triethylenetetramine, tetraethylenepentamine, hexamethylenediamine, diethylaminopropylamine, N-aminoethylpiperazine, BASF's Lamilon C-260, CIBA's Araldite HY-964, Rohm and Haas' Menthenediamine, isophoronediamine, diaminodicyclohexylmethane, m-xylylenediamine, m-phenylenediamine, diaminodiphenylmethane and diaminodiphenyl sulfone, straight-chain diamines represented by $(CH_3)_2N(CH_2)_nN(CH_3)_2$ (n being an integer of 1 to 10), straight-chain tertiary amines represented by $(CH_3)_2N(CH_2)_nCH_3$ (n being an integer of 0 to 10), tetramethylguanidine, alkyl-tertiary monoamines represented by $N[(CH_2)_nCH_3]_3$ (n being an integer of 1 to 10), triethanolamine, piperidine, N,N'-dimethylpiperazine, triethylenediamine, pyridine, picoline, diazabicycloundecene, benzyldimethylamine, 2-(dimethylaminomethyl)phenol, 2,4,6-tris(dimethylaminomethyl)phenol and like secondary or tertiary amines, acid anhydrides such as phthalic anhydride, trimellitic anhydride and benzophenonetetracarboxylic anhydride, various polyamide resins, dicyandiamide and derivatives thereof, various imidazoles, and the like.

The third component of the reaction mixture is the crosslinking agent of the shape memory polymer which is multifunctional, that is, the crosslinking agent is a compound that has a polymerizable functionality of at least 2. Indeed, difunctional crosslinking agents are preferred. Crosslinking agents within the scope of the present invention include diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-haxadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[-(vinyloxy)butyl]succinate, bis ((4-((-vinyloxy)methyl)cyclohexyl)methyl)isophthalate, bis (4-(vinyloxy)butyl)terephthalate, bis[[(4-[vinyloxy)methyl)cyclohexyl]methyl]terephthalate, bis[4-vinyloxy)butyl]adipate, bis[4-(vinyloxy)butyl](methylenedi-1,4-phenylene) biscarbamate, bis [4-(vinyloxy)butyl](4-methyl-1,3-phenylene)biscarbamate, bis[4-(vinyloxy)butyl]1,6-hexanediylbiscarbamate or tris[4-(vinyloxy)butyl] trimellitate.

Of these preferred crosslinking agents, 1,6-hexanediol dimethacrylate (HDODA), poly(propylene glycol) dimethacrylate, tetraethylene glycol dimethacrylate, triethylene glycol diacrylate, triethylene glycol dimethacrylate, triethylene glycol divinyl ether. Of these, 1,6-hexanediol dimethacrylate (HDODA) is even more particularly preferred as the crosslinking agent.

For addition type polymerizations, the initiator of the reaction mixture may be a free radical initiator or an ionic initiator.

Free radical initiators within the scope of the present invention include organic peroxides and azo compounds. Although any of the commercially available organic peroxides may be utilized, tert-butyl peroxide, tert-butyl hydroperoxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. The ionic initiators are preferably cationic initiators. Preferred cationic initiators include boron trifluoride, boron trifluoride diethyl etherate, aluminum trichloride and tin (IV) chloride.

As stated above, the SMP reaction mixture may include a fifth, optional component. That optional component is a modifying polymer. The modifying polymer acts as a viscosity adjustor and, additionally provides the requisite toughness to the resultant shape memory polymer. The requisite toughness of the cured shape memory polymer product is a toughness that meets the quantitative requirements set forth in ASTM Standard Test Procedures D5045 and D6068.

The modifying polymer of the LASMP reaction mixture is a thermoplastic polymer that is compatible with the polymer formed by the reaction product of the photo-reactive monomer and the second monomer compound. The modifying polymer of the shape memory polymer reaction mixture is a thermoplastic polymer that is compatible with the polymer formed by the reaction product of the monomers. When the optional modifying polymer is used the resulting reaction product includes two distinct polymers namely the LASMP polymer and the "modifying" polymer.

In the preferred embodiment, addition polymerization of acrylate monomer is the method used to produce light activated SMPs base matrix, however, other classes of monomers, and methods of polymerization could also be used to form the base polymer matrix provided they are compatible with the photo-reactive monomer polymerizable group. The composition of one acrylate monomer in the formulation has been varied anywhere from approximately 30 to 70 percent by weight but may be altered as needed to tune the $T_g$, more preferably from 45 to 54 percent by weight. The composition of a second acrylate monomer in the formulation has been varied anywhere from 0 to approximately 8 percent by weight but may be altered as needed to tune the $T_g$ and can vary from 0 to 15 percent by weight. The rest of the material in the formulation consists of the photo-reactive monomer and other materials. The monomer can be any photo-reactive monomer with an acrylate compatible group. The amount of these monomers in the formulation has been varied from approximately 40 to 50 percent by weight, although different loadings are also possible and can vary from 30-70 percent by weight. Another component in the SMP formulation is a crosslinking monomer, which can be any monomer having more than one polymerizable functionality. An example of crosslinking agent is HDODA. The composition of crosslinking monomer in the formulation is approximately 1 percent by weight, although different loadings are also possible and can vary from 0-5 percent by weight. Initiators were used to catalyze the polymerization of monomers to form SMP. Examples of initiators are benzoyl peroxide and dicumyl peroxide. The composition of initiators in SMP formulation is 0 to approximately 2 percent by weight, although different loadings are also possible and can vary from 0-5 percent by weight.

After curing the base acrylate polymer, the sample is treated with 350 nm UV light to induce crosslinking of the photo-reactive monomer. The higher crosslinking density represents an increase in the material's $T_g$ creating a more rigid polymer. Next, 254 nm UV light is applied to induce varied amounts of cleavage to decrease the $T_g$ and soften the material. Once the material is softened, it can be hardened by exposure to the original 350 nm wavelength to induce crosslinking again. This is a repeatable cycle.

Additional additives to the mixture can be used to fine-tune the physical properties of the formulations, such as viscosity and toughness. In addition, initiators are added to the mixtures to control the cure temperature of the formulations. The polymers used to make the LASMP described herein are either commercially available or can be synthesized using routine chemistry. Those of skill in the art can readily prepare the polymers using known chemistry.

Numerous samples of the light activated SMP formulation in example 2 below, in the form of planar rectangles, were fabricated in glass molds and these samples were cut and tested by a Dynamic Mechanical Analyzer (DMA) and Differential Scanning Calorimeter (DSC) to check for their glass transition temperatures and mechanical properties before and after light exposure. The polymers used to make the LASMP are selected based on the desired $T_g$, which in turn is based on the desired applications, taking into consideration the environment of use.

Reversible photo-dimerization is a phenomenon that has been known for decades. Potential applications of this phenomenon have been pursued in optical data storage, photoresist materials for lithography and even in the biomedical field as photo-responsive hydrogels. The basic principle for this phenomenon is the [2+2] cycloaddition induced by UV exposure, or other electromagnetic (EM) radiation, and the corresponding photo-cleavage of the cyclobutane derivatives. Usually, the dimerization is carried out at a longer wavelength near 300-400 nm and the photo-cleavage is carried out at a shorter wavelength near 254 nm. Material systems that have been reported in the literatures to exhibit reversible photo-dimerization include coumarin derivatives, cinnamates, and stilbenes. It is well known that coumarin-based photo-reactive monomers will photo-crosslink when exposed to 350 nm or 300 nm light and photo-cleave partially when exposed to 254 nm light.

Aside from isomers, the other major influence on the photo-crosslinking ability of the photo-reactive monomer is the intensity of light which relates to the energy required to make and break bonds. In the preferred embodiment, two wavelengths are used based on their proven use in reversible photo-activated monomer reactions. UV light with emission peak centers at a wavelength of 350 nm was used to initiate photo-crosslinking of the photo-reactive monomer. UV light with emission peak centers at a wavelength of 254 nm was used to induce photo-cleaving of the photo-reactive monomer. Other wavelengths and energies could be used to create the light activated shape memory effect.

The polymer compositions are preferably compressible or expandable by at least a factor of 5, i.e., the polymer compositions can withstand a strain or compression of at least 500%. The polymer compositions show a recovery of at least 90%, preferably above 98%, and most preferably above 99.5%.

The transition temperature of the materials can be controlled, or tuned, by changing the monomer compositions and the kind of monomer, which will enable those skilled in the art to adjust the shape memory effect to a desired temperature at each wavelength.

The previous disclosure will be made more evident by the following examples:

EXAMPLES

Example 1

A formulation was made with 50 weight percent of a first acrylate monomer, butyl acrylate, 8 weight percent of a second acrylate monomer, methyl methacrylate, 40 weight percent photo-reactive monomer (a) from FIG. 1, 1 weight percent of HDODA and 1 weight percent of benzoyl peroxide. A mixture with a composition described above was polymerized by heating at 65° C. in an oven for 24 hours to obtain the cured shape memory polymer. The polymer was further hardened by irradiation with 350 nm light from 15 min to 120 min to increase crosslinking density and the $T_g$. The fixed temporary shape samples were irradiated for equal amounts of time from 15 min to 120 min at 254 nm to reduce crossslinking density and lower the $T_g$. The amount of crosslinking caused by the HDODA combined with the photo-crosslinking determines the $T_g$ range of the material to be from approximately 20° C. (initial uncross linked) to 30° C. (full crosslinking density).

Example 2

A formulation was made with 50 weight percent of an acrylate monomer, butyl acrylate, 48 weight percent photoreactive monomer (b) from FIG. 1, 1 weight percent of HDODA and 1 weight percent of benzoyl peroxide. A mixture with a composition described above was polymerized by heating at 65° C. in an oven for 24 hours to obtain the cured, soft and malleable shape memory polymer. The polymer was further hardened by irradiation with 350 nm light from 15 min to 120 min to increase crosslinking density and the $T_g$. The fixed temporary shape samples were irradiated for equal amounts of time from 15 min to 120 min at 254 nm to reduce crossslinking density and lower the $T_g$. The amount of crosslinking caused by the HDODA combined with the photo-crosslinking determines the $T_g$ range of the material to be from approximately 16° C. (initial uncross linked) to 45° C. (full crosslinking density).

Besides the applications for environmentally restrictive conditions and space, other possible applications of the present discovery include molds for contact lenses manufacturing, molds for composite manufacturing, structural deployment devices for remote systems, games and toys, domestic articles, arts and ornamentation units, medical and paramedical instruments and devices, thermosensitive instruments and security devices, office equipment, garden equipment, educative articles, tricks, jokes and novelty items, building accessories, hygiene accessories, automotive accessories, films and sheets for retractable housings and packaging, coupling material for pipes of different diameters, building games accessories, folding games, scale model accessories, bath toys, boots and shoes inserts, skiing accessories, suction-devices for vacuum cleaners, pastry-making accessories, camping articles, adaptable coat hangers, retractable films and nets, sensitive window blinds, isolation and blocking joints, fuses, alarm devices, sculpture accessories, adaptable hairdressing accessories, plates for braille that can be erased, medical prosthesis, orthopedic devices, furniture, deformable rulers, recoverable printing matrix, formable casts/braces, shoes (soles/in soles), form-fitting spandex, form-fitting clothes, self-ironing clothes, self-fluffing pillow, deployable structures (watertowers), and pipe replacement for underground applications.

The invention pertains to a light activated shape memory polymer prepared from a reaction mixture comprising a photo reactive monomer (a), at least one additional monomer (b) a crosslinking agent (c), and an initiator (d) wherein the mixture of the additional monomer (b), said crosslinking agent (c), and said initiator (d) form the base polymer matrix. The photo reactive monomer (a) may be reversible photo-crosslinking monomer. The photo reactive monomer contains a polymerizable group which allows it to incorporate into said base polymer matrix.

In one embodiment, the photo reactive monomers are coumarin derivatives with the form:

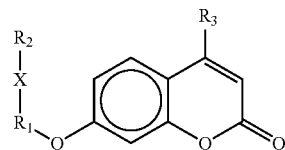

wherein R1 is H, $C_1$-$C_{12}$ alkyl, aryl, alcohol, diol, wherein R3 can be H, $C_1$-$C_{12}$ alkyl or aryl, wherein X can be O, S, N, or nothing, and wherein R2 is a polymerizable group which is either acrylate, polyurethane, siloxane, oxetane, or epoxy based such that the photo reactive monomer is polymerizable with the base polymer matrix wherein the non-polymerizable group is either H, $C_1$-$C_{12}$ alkyl, aryl, alcohol, diol. The polymerizable group may be acrylate based such as a methacrylate, acrylate, vinyl ether, allyl ether, styrene, or vinyl group. In another embodiment, the polymerizable group may be polyurethane based. Polyurethane based polymerizable groups may be, for example, either a hydroxyl, carboxylic acid, acyl chloride, isocyanate, amine or amide group.

In another embodiment, the polymerizable group may be siloxane based such as either silane or trialkoxy silyl in the form of —Si(OR$_3$) where R can be a methyl or ethyl group.

In anther embodiment, the polymerizable group may be epoxy based such as either glycidyl ether, hydroxy, or amine group.

Additionally, the polymerizable group may be oxetane based such as either a hydroxyl, thiol, amine, or oxetane group.

The photo reactive monomers may also comprise cinnamate derivatives with the form:

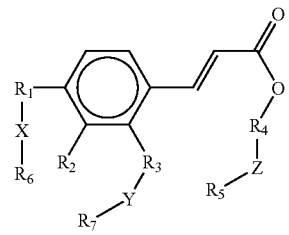

wherein R1, R2, R3, and R4 can be the same or different and are either H, $C_1$-$C_{12}$ alkyl, aryl, alcohol, diol, wherein X, Y, and Z can be the same or different and are either S, O, N or nothing, and wherein R5, R6, R7 must be different such that only one is a polymerizable group which is either acrylate, polyurethane, siloxane, oxetane, or epoxy based such that the photo reactive monomer is polymerizable with the base polymer matrix wherein the non-polymerizable groups are either H, $C_1$-$C_{12}$ alkyl, aryl, alcohol, diol. The polymerizable group is acrylate based such as either a methacrylate, acrylate, vinyl ether, allyl ether, styrene, or vinyl group. Also, the polymerizable group may be polyurethane based such as either a hydroxyl, carboxylic acid, acyl chloride, isocyanate, amine or amide group.

In another embodiment, the polymerizable group may be siloxane based such as either silane or trialkoxy silyl in the form of —Si(OR$_3$) where R can be a methyl or ethyl group. Additionally, the polymerizable group is epoxy based including either glycidyl ether, hydroxy, or amine groups.

In another exemplary embodiment, the polymerizable group is oxetane based, including a hydroxyl, thiol, amine, or oxetane groups.

The photo reactive monomers may also comprise chalcones with the form:

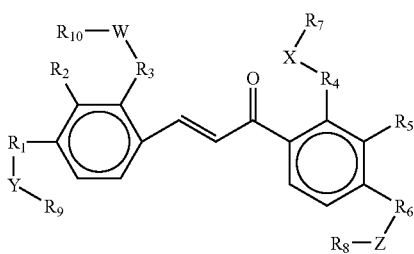

wherein R1, R2, R3, R4, R5, and R6 can be the same or different and can be H, C$_1$-C$_{12}$ alkyl, aryl, alcohol, diol, wherein W, X, Y, and Z can be the same or different and are either S, O, N or nothing, and wherein R7, R8, R9, and R10 must be different such that only one is a polymerizable group which is either acrylate, polyurethane, siloxane, oxetane, or epoxy based such that the photo reactive monomer is polymerizable with the base polymer matrix wherein the non-polymerizable groups are either H, C$_1$-C$_{12}$ alkyl, aryl, alcohol, diol. The polymerizable group attached to the chalcone moiety may be acrylate based including either a methacrylate, acrylate, vinyl ether, allyl ether, styrene, or vinyl group. Further, the polymerizable group may be polyurethane based such as either a hydroxyl, carboxcylic acid, acyl chloride, isocyanate, amine or amide group. Also, the polymerizable group may be siloxane based including silane or trialkoxy silyl in the form of —Si(OR$_3$) where R can be a methyl or ethyl group. The polymerizable group may also be epoxy based including glycidyl ether, hydroxy, or amine groups. The polymerizable group attached to the chalcone moiety may also be oxetane based including hydroxyl, thiol, amine, or oxetane groups.

The photo reactive monomers may also comprise heteroarylene vinylene moieties with the form:

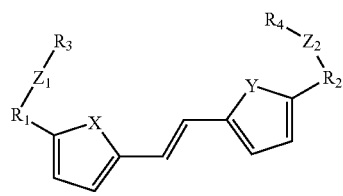

wherein R1 and R2 can be the same or different and are either H, C$_1$-C$_{12}$ alkyl, aryl, alcohol, diol, wherein X and Y can be the same or different and can be O, S, or N—R" wherein R" can be C$_1$-C$_{12}$ alkyl, or aryl, and wherein R3 and R4 must be different such that only one is a polymerizable group which is either acrylate, polyurethane, siloxane, oxetane, or epoxy based such that the photo reactive monomer is polymerizable with the base polymer matrix wherein the non-polymerizable group is either H, C$_1$-C$_{12}$ alkyl, aryl, alcohol, diol. The polymerizable groups can be the same as set forth above.

In another exemplary embodiment, the photo reactive monomers may comprise thymine moieties with the form:

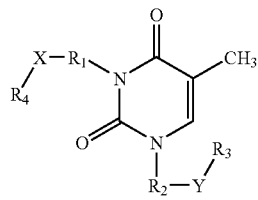

wherein R1 and R2 can be the same or different and are H, C$_1$-C$_{12}$ alky, aryl, alcohol, diol, wherein X and Y can be the same or different and can be O, S, or N, or nothing, and wherein R3 and R4 must be different such that only one is a polymerizable group which is either acrylate, polyurethane, siloxane, oxetane, or epoxy based such that the photo reactive monomer is polymerizable with the base polymer matrix wherein the non-polymerizable group is either H, C$_1$-C$_{12}$ alkyl, aryl, alcohol, diol. The polymerizable groups may be as listed herein above.

In another exemplary embodiment, photo reactive monomers may be Stilbenes with the form:

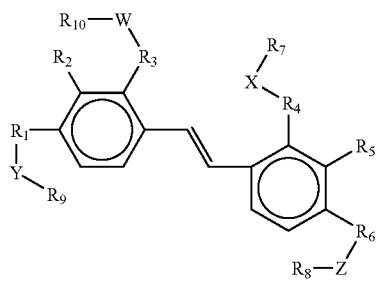

wherein R1, R2, R3, R4, R5, and R6 can be the same or different and can be H, C$_1$-C$_{12}$ alkyl, aryl, alcohol, diol, wherein W, X, Y, and Z can be the same or different and are either S, O, N or nothing, and wherein R7, R8, R9, and R10 must be different such that only one is a polymerizable group which is either acrylate, polyurethane, siloxane, oxetane, or epoxy based such that the photo reactive monomer is polymerizable with the base polymer matrix wherein the non-polymerizable groups are either H, C$_1$-C$_{12}$ alkyl, aryl, alcohol, diol. The polymerizable groups are as listed above.

In another exemplary embodiment, the photo reactive monomer is a monomer that undergoes reversible photo-dimerization in the ultra violet range. The second monomer (b) may be acrylate based, polyurethane based, siloxane based, oxetane based, or epoxy based.

The photo-reactive monomer (a) should be functionalized to blend with said second monomer (b). The crosslinking agent (c) may be 1,6 hexanediol diacrylate (HDODA), and the initiator (d) may be a free radical initiator. The Light Activated Shape memory polymer as set forth above may also contain a modifying polymer, such as polystyrene.

The invention has been described above in conjunction with various, exemplary embodiments of practicing the invention. It will be apparent to those skilled in the art that modifications can be made to those specifically disclosed embodiments without departing from the invention herein disclosed and described; the scope of the invention being limited only by the scope of the attached claims.

What is claimed is:

1. A thermoset cross-linked polymer network comprising polymerized units of (a) 30-70% by weight of a coumarin derivative photo reactive monomer, (b) 30-70% by weight of at least one additional monomer, and (c) more than 0% by weight less than 5% by weight of a crosslinking agent; said thermoset polymer network having a first initial crosslink density due to (c) the crosslinking agent and a second, photo-reversible crosslink density created upon exposure to a predetermined wavelength of light, and wherein the coumarin derivatives have the form:

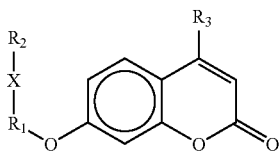

wherein R1 is C1-C12 alkylene, arylene, or a bond, wherein R3 can be H, C1-C12 alkyl or aryl, wherein X can be O, S, HN, or a bond, and wherein R2 is a residue of a polymerizable group which copolymerizes with the (b) at least one additional monomer to form the thermoset cross-linked polymer network, wherein the thermoset cross-linked polymer network is an epoxy resin, oxetane resin, or polyurethane resin.

2. A thermoset cross-linked polymer network as recited in claim 1 wherein said thermoset cross-linked polymer network is a light activated shape memory polymer and said coumarin photo reactive monomer is a photo-reversible crosslinking monomer.

3. A thermoset cross-linked polymer network as recited in claim 1 wherein said polymerizable group is either glycidyl ether or hydroxy.

4. A thermoset cross-linked polymer network as recited in claim 1 wherein said polymerizable group is either a hydroxyl, carboxylic acid, acyl chloride, isocyanate, amine, or amide group.

5. A thermoset cross-linked polymer network as recited in claim 1 wherein said polymerizable group is either a hydroxyl, thiol, or amine group.

6. A thermoset cross-linked polymer network as recited in claim 1 wherein the coumarin photo reactive monomer (a) is a monomer that undergoes reversible photodimerization in the ultra violet range.

7. A thermoset cross-linked polymer network as recited in claim 1 wherein said cross-linking agent (c) is 1,6 hexanediol diacrylate (HDODA).

8. A polymer mixture comprising:
   (1) the thermoset cross-linked polymer network of claim 1;
   (2) a thermoplastic polymer;
   wherein the thermoset polymer has a first initial crosslink density and a second, photo-reversible crosslink density created upon exposure to a predetermined wavelength of light.

9. A polymer mixture as recited in claim 8 wherein said (a) photo reactive monomer is a photo-reversible crosslinking monomer.

10. A polymer mixture as recited in claim 9 wherein said thermoset polymer and said thermoplastic polymer exist in the mixture as distinct polymers.

11. A polymer mixture as recited in claim 8 wherein said (c) cross-linking agent is 1,6 hexanediol diacrylate (HDODA).

12. A polymer mixture as recited in claim 8 wherein said thermoplastic polymer is polystyrene.

* * * * *